US011238831B2

(12) United States Patent
Kwon

(10) Patent No.: US 11,238,831 B2
(45) Date of Patent: Feb. 1, 2022

(54) ELECTRONIC DEVICE AND OPERATING METHOD THEREFOR

(71) Applicant: SAMSUNG ELECTRONICS CO., LTD., Suwon-si (KR)

(72) Inventor: Ohin Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/041,901

(22) PCT Filed: Mar. 25, 2019

(86) PCT No.: PCT/KR2019/003429
§ 371 (c)(1),
(2) Date: Sep. 25, 2020

(87) PCT Pub. No.: WO2019/190134
PCT Pub. Date: Oct. 3, 2019

(65) Prior Publication Data
US 2021/0012750 A1  Jan. 14, 2021

(30) Foreign Application Priority Data
Mar. 27, 2018 (KR) .................. 10-2018-0035361

(51) Int. Cl.
*G09G 5/10* (2006.01)
*G04G 9/00* (2006.01)
(Continued)

(52) U.S. Cl.
CPC .............. *G09G 5/10* (2013.01); *G04G 9/007* (2013.01); *G09G 2320/0686* (2013.01);
(Continued)

(58) Field of Classification Search
CPC combination set(s) only.
See application file for complete search history.

(56) References Cited

U.S. PATENT DOCUMENTS 6,985,236 B2   1/2006   Seko et al.
8,564,726 B2   10/2013  Cho et al.
(Continued)

FOREIGN PATENT DOCUMENTS

CN   107395929 A   11/2017
EP   3 319 076 A1   5/2018
(Continued)

OTHER PUBLICATIONS

International Search Report (PCT/ISA/210) dated Jul. 3, 2019 issued by the International Searching Authority in International Patent Application No. PCT/KR2019/003429.
(Continued)

*Primary Examiner* — Wesner Sajous
(74) *Attorney, Agent, or Firm* — Sughrue Mion, PLLC

(57) ABSTRACT

Provided are an electronic device and an operating method thereof. The electronic device includes a display, a plurality of optical sensor units arranged to respectively correspond to a plurality of regions divided on the display, a memory storing one or more instructions, and a processor configured to execute the one or more instructions stored in the memory, in which the processor is further configured to, by executing the one or more instructions, determine an intensity and a direction of external light incident to each of the plurality of regions divided on the display, by using the plurality of optical sensor units, determine a shadow region on the display, based on the determined intensity and direction of the external light corresponding to each of the plurality of regions, and control the display to provide a shadow effect on the determined shadow region, overlappingly with an image that is currently displayed on the display.

15 Claims, 17 Drawing Sheets

(51) Int. Cl.
*H04N 21/43* (2011.01)
*G09G 5/14* (2006.01)
*G09G 3/20* (2006.01)
*H04N 9/64* (2006.01)
*H04N 21/431* (2011.01)

(52) U.S. Cl.
CPC ... *G09G 2340/12* (2013.01); *G09G 2360/144* (2013.01); *H04N 21/431* (2013.01)

(56) References Cited

U.S. PATENT DOCUMENTS

| | | |
|---|---|---|
| 9,449,561 B1 | 9/2016 | Umansky et al. |
| 10,685,608 B2 | 6/2020 | Son et al. |
| 2005/0230720 A1 | 10/2005 | Miyagawa et al. |
| 2006/0158516 A1* | 7/2006 | Suginobu ............. H04N 9/3194 348/189 |
| 2007/0236485 A1 | 10/2007 | Trepte |
| 2008/0291543 A1 | 11/2008 | Nomura et al. |
| 2008/0297487 A1 | 12/2008 | Hotelling et al. |
| 2010/0079426 A1 | 4/2010 | Rance et al. |
| 2012/0212467 A1 | 8/2012 | Kohtoku |
| 2013/0002731 A1 | 1/2013 | Tam |
| 2013/0222354 A1* | 8/2013 | Koivunen ............ G09G 3/3611 345/207 |
| 2014/0168677 A1 | 6/2014 | Mukaibara et al. |
| 2014/0232695 A1* | 8/2014 | McGaughan ......... G06F 3/0426 345/175 |
| 2017/0064219 A1 | 3/2017 | Lin et al. |
| 2017/0316757 A1* | 11/2017 | Whang ................ G09G 3/3666 |
| 2018/0165052 A1* | 6/2018 | Kim .......................... G06F 3/14 |
| 2018/0330697 A1 | 11/2018 | Le et al. |
| 2019/0353767 A1* | 11/2019 | Eberspach ............. G01S 17/89 |

FOREIGN PATENT DOCUMENTS

| | | |
|---|---|---|
| JP | 2011-227259 A | 11/2011 |
| KR | 10-2000-0001605 A | 1/2000 |
| KR | 20-2000-0001605 U | 1/2000 |
| KR | 10-2002-0078067 A | 10/2002 |
| KR | 10-2006-0106046 A | 10/2006 |
| KR | 10-2015-0146375 A | 12/2015 |
| WO | 2011/131204 A1 | 10/2011 |
| WO | 2016/195301 A1 | 12/2016 |

OTHER PUBLICATIONS

Written Opinion (PCT/ISA/237) dated Jul. 3, 2019 issued by the International Searching Authority in International Patent Application No. PCT/KR2019/003429.
Communication issued Jan. 28, 2021 by the European Patent Office in European Patent Application No. 19775191.0.
Communication dated Oct. 11, 2021 issued by the China National Intellectual Property Administration in Chinese Application No. 201980018769.7.

* cited by examiner

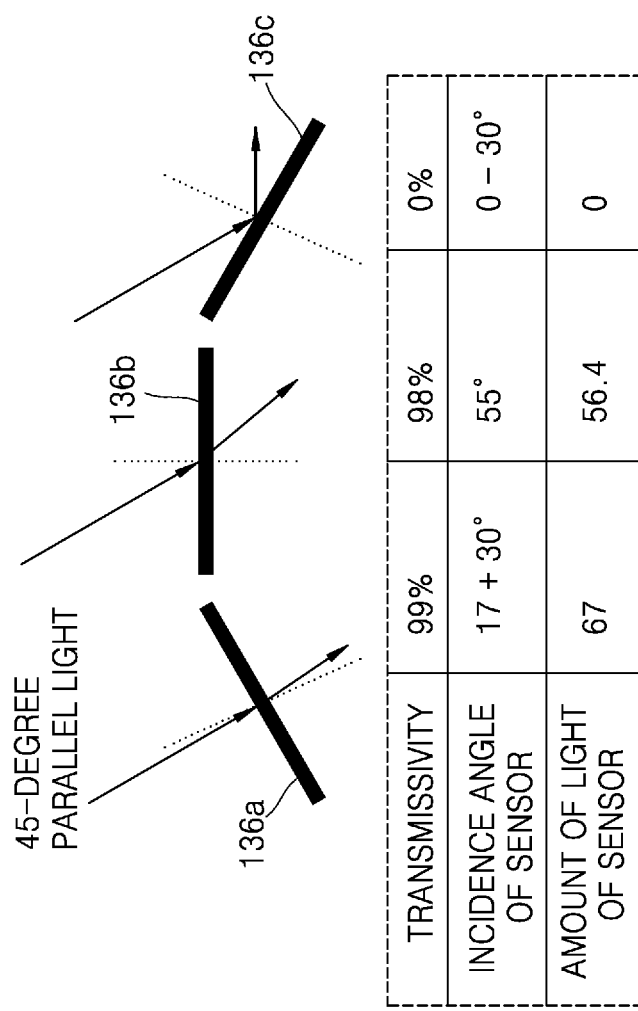

ELECTRONIC DEVICE AND OPERATING METHOD THEREFOR

TECHNICAL FIELD

The present disclosure relates to an electronic device and an operating method of the electronic device, and more particularly, to an electronic device which controls a display based on external light, and an operating method of the electronic device.

BACKGROUND ART

Display devices have functions of displaying images that users may watch. Users may watch broadcasts through the display devices. A display device displays broadcasts selected by a user from broadcast signals transmitted from a broadcasting station. Currently, broadcasting is shifting worldwide from analog broadcasting to digital broadcasting.

Digital broadcasting refers to broadcasting of digital images and voice signals. Digital broadcasting has less data loss due to being more robust against external noise, is more advantageous for error correction, has a higher resolution, and provides a clearer screen than analog broadcasting. Unlike analog broadcasting, digital broadcasting may provide an interactive service.

Moreover, smart TVs providing various content in addition to digital broadcasting functions have been provided. It is desired that smart TVs analyze and provide what a user wants without manipulation of the user, instead of operating passively in response to selection of the user.

Furthermore, recently, various types of display devices have been developed, and development of display devices having various display functions satisfying users' demands and intentions as well as a broadcasting function is needed.

DESCRIPTION OF EMBODIMENTS

Technical Problem

The present disclosure provides an electronic device which controls a display based on external light incident to the display and an operating method of the electronic device.

Technical problems to be solved in the disclosure are not limited to the above-mentioned technical problems, and other unmentioned technical problems may be clearly understood by those skilled in the art from the following descriptions.

Solution to Problem

According to an aspect of the present disclosure, an electronic device includes a display, a plurality of optical sensor units arranged to respectively correspond to a plurality of regions divided on the display, a memory storing one or more instructions, and a processor configured to execute the one or more instructions stored in the memory, in which the processor is further configured to, by executing the one or more instructions, determine an intensity and a direction of external light incident to each of the plurality of regions divided on the display, by using the plurality of optical sensor units, determine a shadow region on the display, based on the determined intensity and direction of the external light corresponding to each of the plurality of regions, and control the display to provide a shadow effect on the determined shadow region, overlappingly with an image that is currently displayed on the display.

According to another aspect of the present disclosure, an operating method of an electronic device includes determining an intensity and a direction of external light incident to each of a plurality of regions divided on the display, by using a plurality of optical sensor units arranged to respectively correspond to the plurality of regions of the display, determining a shadow region on the display, based on the determined intensity and direction of the external light corresponding to each of the plurality of regions, and controlling the display to provide a shadow effect on the determined shadow region, overlappingly with an image that is currently displayed on the display.

According to another aspect of the present disclosure, a non-transitory computer-readable recording medium has recorded thereon a program for executing the operating method on a computer.

BRIEF DESCRIPTION OF DRAWINGS

FIGS. 6A and 6B are views for describing an example of optical sensing using an optical sensor unit, according to an embodiment of the present disclosure;

MODE OF DISCLOSURE

Figure 1:
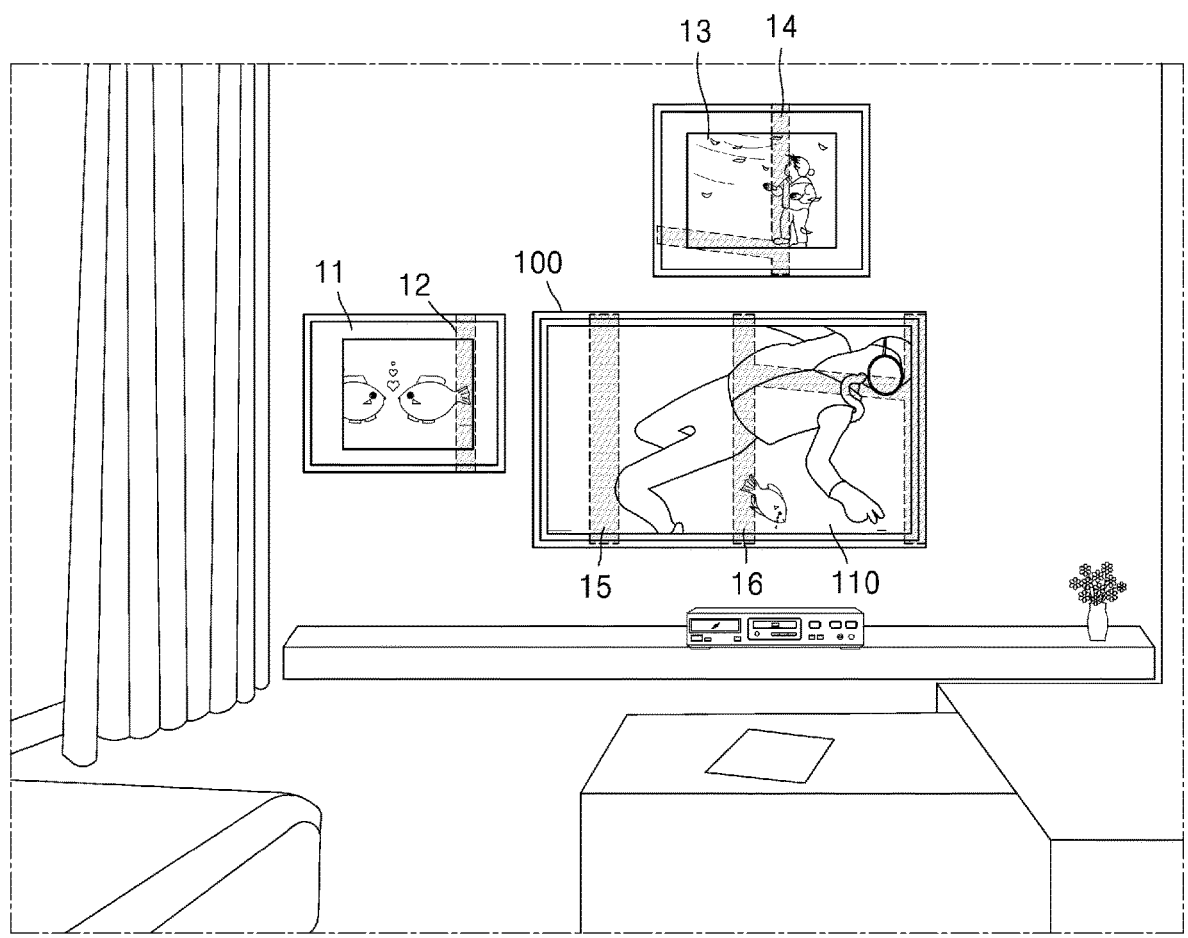
FIG. 1 is a view for describing an example of an operating method of an electronic device according to an embodiment of the present disclosure.

Hereinafter, embodiments of the disclosure will be described in detail with reference to the attached drawings to allow those of ordinary skill in the art to easily carry out the embodiments of the disclosure. However, the disclosure may be implemented in various forms, and are not limited to the embodiments described herein. To clearly describe the disclosure, parts that are not associated with the description have been omitted from the drawings, and throughout the specification, identical reference numerals refer to identical parts.

Although terms used in the disclosure are selected with general terms popularly used at present under the consideration of functions in the disclosure, the terms may vary according to the intention of those of ordinary skill in the art, judicial precedents, or introduction of new technology. Thus, the terms used in the disclosure should be defined not by the simple names of the terms but by the meaning of the terms and the contents throughout the disclosure.

Terms such as first, second, and the like may be used to describe various elements, but the elements should not be limited to those terms. These terms may be used for the purpose of distinguishing one element from another element.

The terms used in the disclosure are for the purpose of describing particular exemplary embodiments only and are not intended to limit the disclosure. The singular forms are intended to include the plural forms as well, unless the context clearly indicates otherwise. Throughput the specification, when a part is connected to another part, the part is not only directly connected to another part but also electrically connected to another part with another device intervening in them. If it is assumed that a certain part includes a certain component, the term "including" means that a corresponding component may further include other components unless a specific meaning opposed to the corresponding component is written.

In the present specification, especially, in the claims, the use of "the" and other demonstratives similar thereto may correspond to both a singular form and a plural form. Unless the order of operations of a method according to the present disclosure is explicitly mentioned or described otherwise, the operations may be performed in a proper order. The disclosure is not limited by the order the operations are mentioned.

The phrase used in various parts of the present specification, such as "in some embodiments" or "in an embodiment" does not necessarily indicate the same embodiment.

Some embodiments of the present disclosure may be represented by block components and various process operations. All or some of such functional blocks may be implemented by various numbers of hardware and/or software components which perform specific functions. For example, functional blocks of the disclosure may be implemented with one or more microprocessors or circuit elements for a specific function. The functional blocks of the disclosure may also be implemented with various programming or scripting languages. Functional blocks may be implemented as an algorithm executed in one or more processors. Furthermore, the disclosure may employ any number of conventional techniques for electronics configuration, signal processing and/or control, data processing and the like. The term "mechanism", "element", "means", or "component" is used broadly and is not limited to mechanical or physical embodiments.

Connecting lines or connecting members between elements shown in the drawings are intended to merely illustrate functional connections and/or physical or circuit connections. In an actual device, connections between elements may be indicated by replaceable or added various functional connections, physical connections, or circuit connections.

Hereinafter, the present disclosure will be described with reference to the accompanying drawings.

FIG. 1 is a view for describing an example of an operating method of an electronic device according to an embodiment of the present disclosure.

Figure 2:
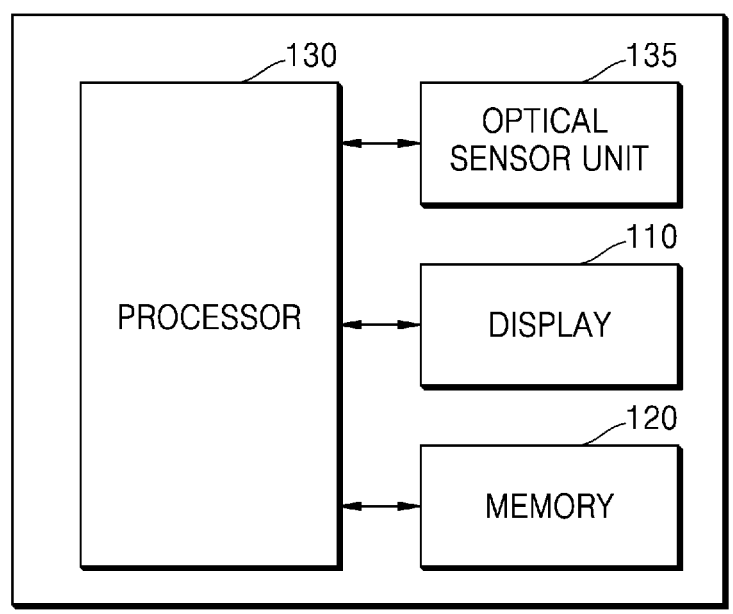
FIGS. 2 and 3 are block diagrams of an electronic device according to an embodiment of the present disclosure.
Figure 3:
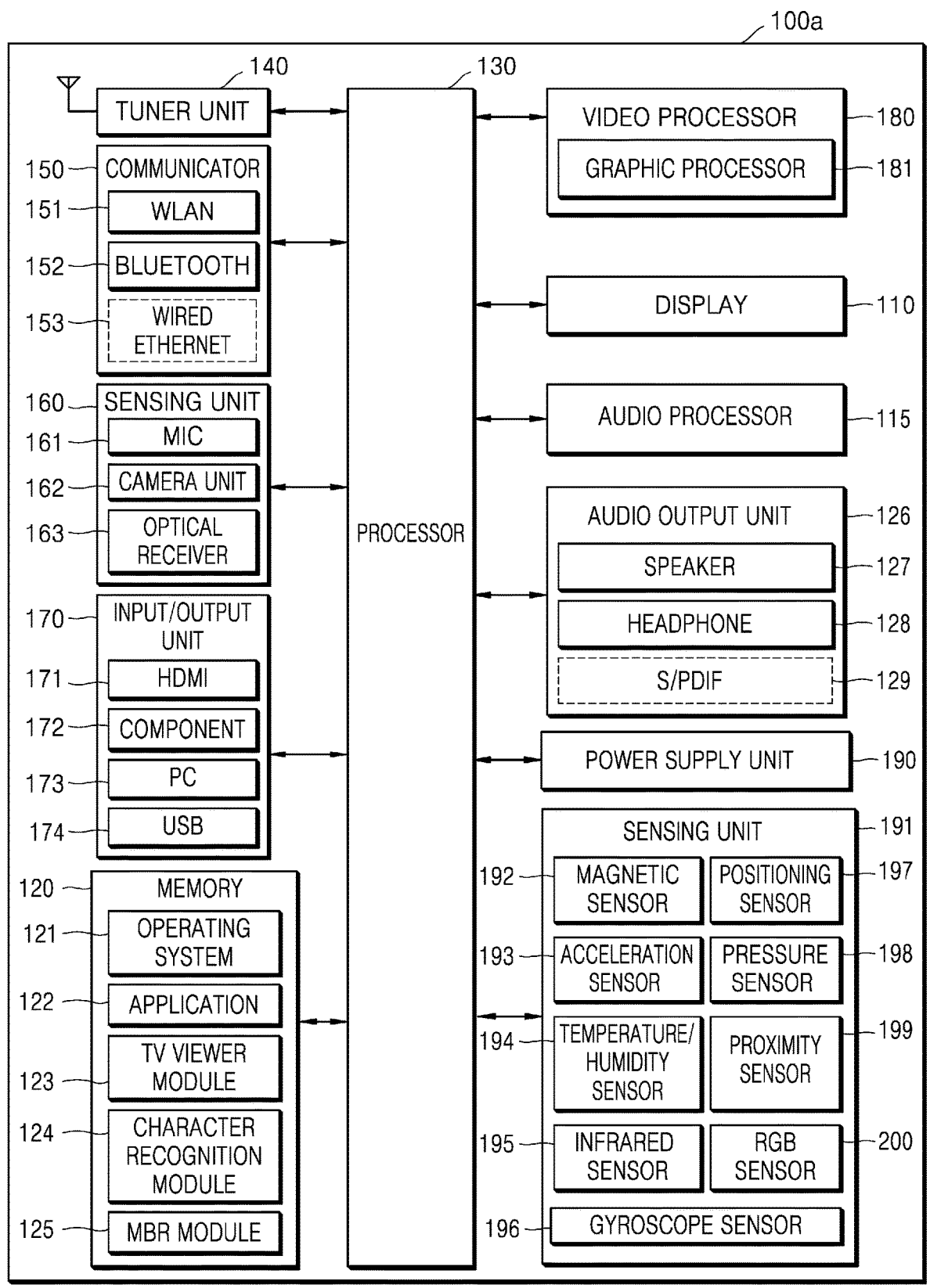

An electronic device 100 (see FIGS. 2 and 3) according to an embodiment of the present disclosure may be implemented as a device including a display 110 (see FIGS. 2 and 3).

The electronic device 100 according to an embodiment of the present disclosure may be, but not limited to, a television (TV). For example, the electronic device 100 may be implemented with various electronic devices such as a wearable device, a desktop, a cellular phone, a tablet personal computer (PC), a digital camera, a camcorder, a laptop computer, an electronic(e)-book terminal, a digital broadcasting terminal, a personal digital assistant (PDA), a portable multimedia player (PMP), a navigator, an MP3 player, and so forth. The electronic device 100 may be of a fixed type or a mobile type, and may be a digital broadcasting receiver capable of receiving digital broadcasting.

The electronic device 100 according to an embodiment of the present disclosure may be implemented with not only a flat display device, but also a curved display device provided with a screen having a curvature or a flexible display device having an adjustable curvature. An output resolution of the electronic device 100 may include, for example, high definition (HD), full HD, ultra HD, or a higher resolution than ultra HD.

The electronic device 100 according to an embodiment of the present disclosure may output various contents, etc., such as a broadcasting program, a movie, etc., received through a tuner unit 140 (see FIG. 3) through the display 110. The electronic device 100 may output an execution screen of an application, a widget, etc., operable on the electronic device 100 or an image such as a picture, a drawing, etc., through the display 110.

The electronic device 100 according to an embodiment of the present disclosure may be arranged attached on the wall as a wall-mounted type that is attachable onto or detachable from the wall or may be arranged on a support in the form of a frame support, without being limited thereto. The exterior of the electronic device 100 according to an embodiment of the present disclosure may be implemented in the form of a frame. The electronic device 100 having a frame form may output an image including, for example, a famous painting, a picture, etc., through the display 110 unless the user is watching a broadcasting program or other contents. In this case, the user may use or recognize the electronic device 100 attached on the wall as a famous painting frame or large picture frame.

According to an embodiment of the disclosure, the display 110 of the electronic device 100 may be implemented as a plasma display panel (PDP), a liquid crystal display (LCD), an organic light-emitting diode (OLED), a light-emitting diode (LED), a cathode ray tube (CRT), etc.

Generally, a display is a device for emitting light by using self-light-emission property or backlight. Thus, even when external light (e.g., sun light, an artificial lighting, etc.) is incident to the display or around the display, any display change does not occur in a general display due to light-emission property of the display. For example, when an external light source is incident to a space where several objects are arranged, depending on intensity or direction of the light source, shadow appears in general objects, whereas any shadow may not appear in a general display outputting an image. Thus, the user viewing the one space may feel a sense of difference among a display device and other objects.

In particular, when the display device is used as a frame, as the display device displays an image on a display, a display effect as if the user views an actual frame, and at the same time, shadow caused by an external light source does not appear on the display, differently from nearby objects, such that the user may easily recognize that the display device is not the actual frame.

According to an embodiment of the present disclosure, when the electronic device 100 is used like a frame by outputting an execution screen of an application or a widget, an image etc., on the display 110 (hereinafter, this mode will be referred to as a 'frame mode'), the electronic device 100 may provide a shadow effect where shadow caused by light appears on the display 110 on a front surface of the electronic device 100, allowing the user viewing the display 110 to recognize the display 110 as a picture in the actual frame.

Figure 4:
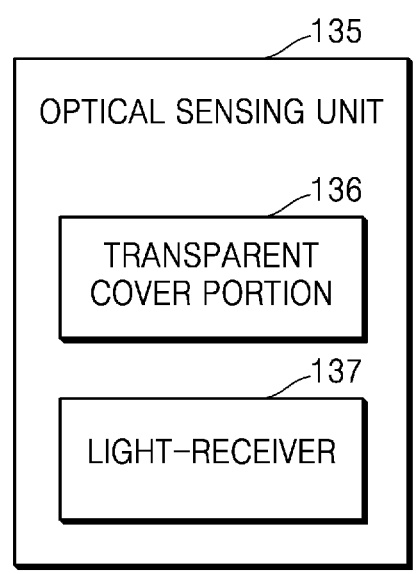
FIG. 4 is a block diagram of an optical sensor unit according to an embodiment of the present disclosure.

The electronic device 100 according to an embodiment of the present disclosure may detect the intensity and direction of external light incident to the display 110 by using an optical sensor unit 135 (see FIG. 4). The electronic device 100 may determine, based on the detected intensity and direction of the external light, a region where shadow (e.g., shadow of a frame mounted on an edge of the display 110, shadow of a nearby object, etc.) appears on the display 110 (hereinafter, referred to as a 'shadow region'). The electronic device 100 may control the display 110 to provide a shadow effect to correspond to the shadow region.

Referring to FIG. 1, as sun light or a lighting, etc., shines a space, shadow of nearby objects may appear on another object. For example, shadow 12 of another object may appear on a frame 11 attached on the wall near the electronic device 100, and shadow 14 may appear on another frame 13.

According to an embodiment of the present disclosure, a display effect may be provided in the display 110 attached on the same wall on the front surface of the electronic device 100, such that the user may recognize that shadow 15 and shadow 16 of another object appear. Thus, the user viewing the display 110 operating in the frame mode may feel like that the user sees the actual frame without a sense of difference from nearby objects.

According to an embodiment of the present disclosure, due to external light, it is recognized as if shadow is actually formed on the display 110, thereby implementing a realistic frame mode.

FIG. 1 illustrates an embodiment, and the present disclosure is not limited thereto.

FIGS. 2 and 3 are block diagrams of an electronic device according to an embodiment of the present disclosure.

As shown in FIG. 2, the electronic device 100 may include the display 110, the memory 120, the processor 130, and the optical sensor unit 135. However, all the illustrated elements are not essential elements. The electronic device 100 may be implemented with a larger or smaller number of elements than the illustrated elements.

For example, as shown in FIG. 3, the electronic device 100 according to an embodiment of the present disclosure may further include the tuner unit 140, a communicator 150, a detector 160, an input/output (I/O) unit 170, a video processor 180, an audio processor 115, an audio output unit 126, a power source unit 190, and a sensor 191, in addition to the display 110, the memory 120, the processor 130, and the optical sensor unit 135.

An electronic device 100a shown in FIG. 3 may be an embodiment of the electronic device 100 shown in FIGS. 1 and 2.

Hereinbelow, the foregoing elements will be described.

The display 110 may display video included in a broadcast signal received through the tuner unit 140 of FIG. 3 on a screen under control of the processor 130. The display 110 may display contents (e.g., video) input through the communicator 150 or the I/O unit 170. The display 110 may output an image stored in the memory 120 under control of the processor 130.

The display 110 may convert an image signal, a data signal, an on-screen display (OSD) signal, a control signal, or the like, processed by the processor 130, to generate a driving signal. The display 110 may be implemented with a PDP, an LCD, an OLED, a flexible display, or the like, and may also be implemented with a three-dimensional (3D) display. The display 110 may include a touch screen and thus may be used as an input device as well as an output device.

According to an embodiment of the present disclosure, the display 110 may display an image, under control of the processor 130. The display 110 may provide the shadow effect overlappingly with an image currently displayed, under control of the processor 130.

The memory 120 may store various data, programs, or applications for driving and controlling the electronic device 100, under control of the processor 130. The memory 120 may store input/output signals or data corresponding to driving of the video processor 180, the display 110, the audio processor 115, the audio output unit 126, the power supply unit 130, the tuner unit 140, the communicator 150, the detector 160, and the I/O unit 170.

The memory 120 may store an operating system 121 for control of the electronic device 100 and the controller 130, an application 122 that is initially provided from a manufacturer or downloaded from an external source, a graphic user interface (GUI) associated with an application, an object (e.g., an image, a text, an icon, a button, etc.) for providing the GUI, user information, a document, databases, or related data.

The memory 120 may include a TV viewer module 123 that includes one or more instructions for receiving an input signal from a remote control device (not shown), performing channel control corresponding to the input signal, or entering a channel scroll user interface mode when the input signal corresponds to a pre-designated input, a character recognition module 124 including one or more instructions for recognizing information from contents received from an external device (not shown), and a MBR module 125 including one or more instructions for channel control from an external device (not shown).

The memory 120 may include a read-only memory (ROM), a random access memory (RAM), or a memory card (e.g., a micro secure digital (SD) card, a USB memory, etc., not shown) mounted on the electronic device 100. The memory 120 may include a non-volatile memory, a volatile memory, a hard disk drive (HDD), or a solid state drive (SSD).

According to an embodiment of the present disclosure, the memory 120 may include a storage medium of at least one type of a flash memory type, a hard disk type, a multimedia card micro type, a card type memory (e.g., an SD or extreme digital (XD) memory, etc.), a RAM, a static random access memory (SRAM), a ROM, an electrically erasable programmable read-only memory (EEPROM), a programmable read-only memory (PROM), a magnetic memory, a magnetic disk, an optical disk, and so forth.

According to an embodiment of the present disclosure, the memory 120 may store an image.

According to an embodiment of the present disclosure, the memory 120 may store an algorithm for calculating the intensity and direction of light by using Fresnel's Formulas, under control of the processor 130.

According to an embodiment of the present disclosure, the memory 120 may store a table about a sensing value with respect to the intensity and direction of light incident at each arrangement angle of the transparent cover portion 136.

The processor 130 may control an overall operation of the electronic device 100 and a signal flow among internal elements of the electronic device 100, and process data. The processor 130 may execute an operating system (OS) and various applications stored in the memory 120, when there is a user input is input or a preset and stored condition is satisfied.

The processor 130 may include a RAM that stores a signal or data input from an external source or is used as a storage region corresponding to various tasks performed by the electronic device 100, a ROM having stored therein a control program for controlling the electronic device 100, and a processor.

The processor 130 may include a graphic processing unit (GPU, not shown) for processing graphics corresponding to video. The processor 130 may be implemented as a system on chip (SoC) in which a core (not shown) and a GPU (not shown) are integrated. The processor 130 may include a single core, a dual core, a triple core, a quad core, and a core of a multiple thereof.

The processor 130 may also include a plurality of processors. For example, the processor may be implemented with a main processor (not shown) and a sub processor (not shown) which operates in a sleep mode.

According to an embodiment of the present disclosure, the processor 130 may determine the intensity and direction of external light incident to each of a plurality of regions divided on the display 110 using a plurality of optical sensor units 135, by executing one or more instructions stored in the memory 120.

The processor 130 may sense the intensity of external light incident to each of the plurality of regions divided on the display 110 using a light-receiver 137, by executing one or more instructions stored in the memory 120.

The processor 130 may determine the direction of external light incident to a sensed region, based on the sensed intensity of the light and an angle of the transparent cover portion 136 arranged in the sensed region, by executing one or more instructions stored in the memory 120.

When the processor 130 determines the direction of light corresponding to one of the plurality of regions of the display 110, the processor 130 may determine the direction of light corresponding to the region based on the direction of light corresponding to a nearby region around the region, by executing one or more instructions stored in the memory 120.

In addition, according to an embodiment of the present disclosure, the processor 130 may determine a shadow region on the display 110 based on the intensity and direction of light corresponding to each of the plurality of regions, by executing one or more instructions stored in the memory 120.

The processor 130 may compare the intensity and direction of light corresponding to one of the plurality of regions of the display 110 with the intensity and direction of light corresponding to a nearby region to determine a shadow region, by executing one or more instructions stored in the memory 120.

According to an embodiment of the present disclosure, the processor 130 may control the display 110 to provide a shadow effect on the shadow region, overlappingly with the image currently displayed on the display 110, by executing one or more instructions stored in the memory 120.

The processor 130 may control the display 110 to display an image displayed on the determined shadow region darker than an image displayed on the nearby region to provide the shadow effect, by executing one or more instructions stored in the memory 120.

According to an embodiment of the present disclosure, when the frame mode of the electronic device 100 is terminated, the processor 130 may control the display 100 to display the image displayed on the determined shadow region brighter than the image displayed on the nearby region, by executing one or more instructions stored in the memory 120.

According to an embodiment of the present disclosure, the optical sensor unit 135 may include the light-receiver 137 that senses the intensity of incident light and the transparent cover portion 136 arranged on the light-receiver 137. According to an embodiment of the present disclosure, the light-receiver 137 may include a transparent photodiode. According to an embodiment of the present disclosure, the transparent cover portion 136 may be processed with a transparent material (e.g., crystal).

According to an embodiment of the present disclosure, the electronic device 100 may include the plurality of optical sensor units 135 to respectively correspond to the plurality of regions divided on the display 110. The plurality of optical sensor units 135 may be arranged on a plurality of layers constituting the display 110.

The optical sensor unit 135 will be described in more detail with reference to FIGS. 4 through 9.

The tuner unit 140 may select a frequency of a channel the electronic device 100 is to receive from among many electric wave components by tuning the frequency through amplification, mixing, resonance, or the like with respect to a broadcast signal received wiredly or wirelessly. The broadcast signal may include audio, video, and additional information (for example, an electronic program guide (EPG)).

The tuner unit 140 may receive a broadcast signal in a frequency band corresponding to a channel number based on a user input (for example, a control signal received from a remote control device (not shown), such as a channel number input, a channel up-down input, and a channel input on an EPG screen).

The tuner unit 140 may receive a broadcast signal from various sources such as terrestrial broadcasting, cable broadcasting, satellite broadcasting, Internet broadcasting, and so forth. The tuner unit 140 may receive a broadcast signal from a source such as analog broadcasting, digital broadcasting, or the like. The broadcast signal received through the tuner unit 140 is decoded (e.g., audio-decoded, video-decoded, or additional-information-decoded) and separated into audio, video, and/or additional information. The separated audio, video, and/or additional information is stored in the memory 120 under control of the processor 130.

There may be one or a plurality of tuner units 140 in the electronic device 100. The tuner unit 140 may be implemented as all-in-one with the electronic device 100 or as a separate device including a tuner unit electrically connected with the electronic device 100 (e.g., a set-top box (not shown) or a tuner unit (not shown) connected to the I/O unit 170).

The communicator 150 may connect the electronic device 100 with an external device (e.g., an audio device, etc.) (not shown) under control of the processor 130. The processor 130 may transmit/receive contents to/from an external device (not shown) connected through the communicator 150, download an application from the external device (not shown), or browse the web. The communicator 150 may include one of a wireless local area network (WLAN) 151, Bluetooth 152, and wired Ethernet 153, depending on capabilities and structure of the electronic device 100. The communicator 150 may include a combination of the WLAN 151, the Bluetooth 152, and the wired Ethernet 153.

The communicator 150 may receive a control signal of a remote control device (not shown) under control of the processor 130. The control signal may be implemented as a Bluetooth type, an RF signal type, or a WiFi type.

The communicator 150 may further include other short-range communications (e.g., near field communication (NFC) (not shown), Bluetooth Low Energy (BLE) (not shown), etc.) in addition to Bluetooth.

The detector 160 may detect a user's voice, a user's image, or a user's interaction, and may include a microphone 161, a camera unit 162, and an optical receiver 163.

The microphone 161 may receive an uttered voice of the user. The microphone 161 may convert the received voice into an electric signal and output the electric signal to the processor 130. The user's voice may include, for example, a voice corresponding to a menu or a function of the electronic device 100.

The camera unit 162 may obtain an image frame such as a still image, a moving image, etc. The image captured by the image sensor may be processed by the processor 130 or a separate image processor (not shown).

An image frame processed by the camera unit 162 may be stored in the memory 1200 or transmitted to an external source through the communicator 150. Two or more camera units 162 may be provided according to a structure aspect of the electronic device 100.

The optical receiver 163 may receive an optical signal (including a control signal) received from an external remote control device (not shown). The optical receiver 163 may receive an optical signal corresponding to a user input (e.g., a touch, a press, a touch gesture, a voice, or a motion) from the remote control device (not shown). A control signal may be extracted from the received optical signal under control of the processor 130. For example, the optical receiver 163 may receive a control signal corresponding to a channel up/down button for changing a channel from the remote control device (not shown).

The I/O unit 170 receives video (e.g., moving images, etc.), audio (e.g., a voice, music, etc.), and additional information (e.g., an EPG, etc.) from an external source outside the electronic device 100, under control of the processor 130. The I/O unit 170 may include at least one of a high-definition multimedia interface (HDMI) port 171, a component jack 172, a PC port 173, or a universal serial bus (USB) port 174. The I/O unit 170 may include a combination of at least one of the HDMI port 171, the component jack 172, the PC port 173, or the USB port 174. An external image providing device (not shown) may be connected through the HDMI port 171.

The video processor 180 may process video data received by the electronic device 100. The video processor 180 may perform various image processing, such as decoding, scaling, noise filtering, frame rate conversion, resolution conversion, etc., with respect to video data.

A graphic processing unit (GPU) 181 may generate a screen including various objects such as an icon, an image, a text, etc., by using a calculator (not shown) and a renderer (not shown). The calculator (not shown) may calculate an attribute value such as coordinates, shapes, sizes, colors, etc., of respective objects based on a layout of the screen by using a user input detected by the detector 160. The renderer (not shown) may generate the screen of various layouts including an object based on the attribute value calculated by the calculator (not shown). The screen generated by the rendering unit (not shown) may be displayed in a display region of the display 110.

The audio processor 115 may process audio data. The audio processor 115 may perform various processing such as decoding, amplification, noise filtering, etc., with respect to the audio data. Meanwhile, the audio processor 115 may include a plurality of audio processing modules for processing audio corresponding to a plurality of contents.

The audio output unit 126 may output audio included in a broadcast signal received through the tuner unit 140 under control of the processor 130. The audio output unit 126 may output audio (e.g., voice, sound, etc.) input through the communicator 150 or the I/O unit 170. The audio output unit 126 may output audio stored in the memory 120 under control of the processor 130. The audio output unit 126 may include at least one of a speaker 127, a headphone output terminal 128, or a Sony/Phillips digital interface (S/PDIF) output terminal 129. The audio output unit 126 may include a combination of at least one of the speaker 127, the headphone output terminal 128, or the S/PDIF output terminal 129.

The power supply unit 190 may supply power, which is input from an external power source, to the internal elements of the electronic device 100, under control of the processor 130. The power supply unit 190 may supply power, which is output from one or more batteries (not shown) included in the electronic device 100, to the internal elements, under control of the processor 130.

The sensor 191 may sense a state of the electronic device 100 or a state near the electronic device 100, and transfer sensed information to the processor 130.

The sensor 191 may include, but not limited to, at least one of a magnetic sensor 192, an acceleration sensor 193, a temperature/humidity sensor 194, an infrared sensor 195, a gyroscope sensor 196, a positioning sensor (e.g., a global positioning system (GPS)) 1970, a pressure sensor 198, a proximity sensor 199, or a red/green/blue (RGB) sensor (or an illuminance sensor) 200. A function of each sensor may be intuitively construed from a name of each sensor by those of ordinary skill in the art, and thus will not be described in detail.

The electronic device 100 including the display 110 may be electrically connected with a separate external device (e.g., a set-top box, not shown) including the tuner unit 140.

It would be also easily understood by those of ordinary skill in the art that the electronic device 100 may be implemented with, but not limited to, an analog TV, a digital TV, a 3D TV, a smart TV, an LED TV, an OLED TV, a plasma TV, a monitor, or the like.

Meanwhile, the block diagrams of the electronic devices 100 and 100a are block diagrams for an embodiment of the disclosure. Elements of the block diagram may be integrated, added, or omitted depending on the specifications of the electronic device 100 implemented actually. That is, when necessary, two or more elements may be integrated into one element or one element may be divided into two or more elements. A function executed in each element (or module) is intended to describe embodiments of the disclosure, and a detailed operation or apparatus thereof does not limit the scope of the disclosure.

Figure 5A:
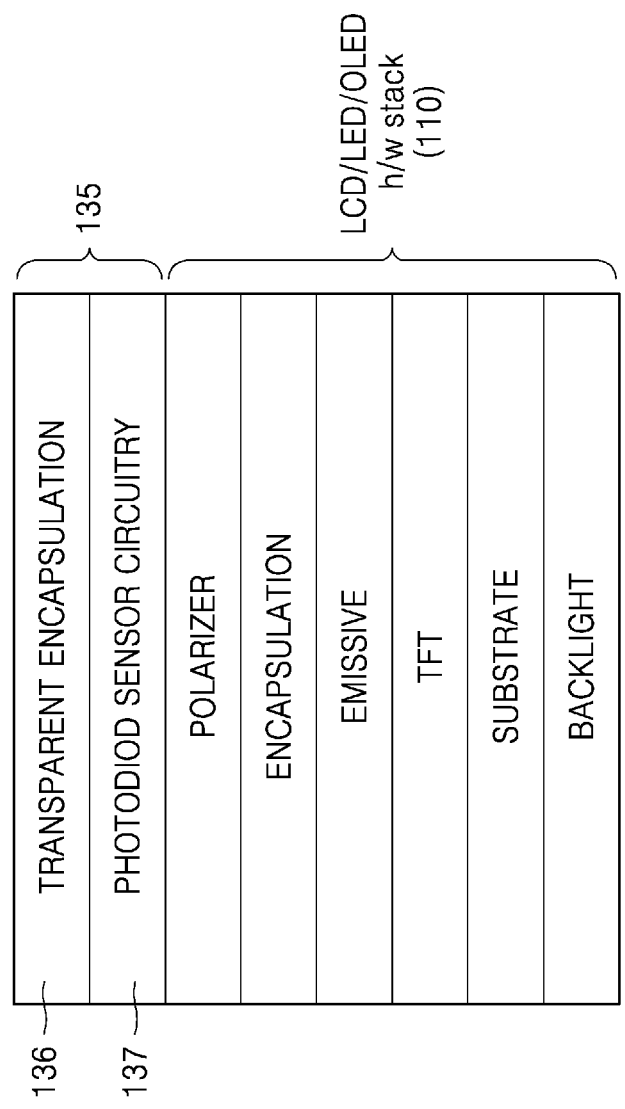
FIGS. 5A and 5B are views for describing the structure of an optical sensor unit according to an embodiment of the present disclosure.
Figure 5B:
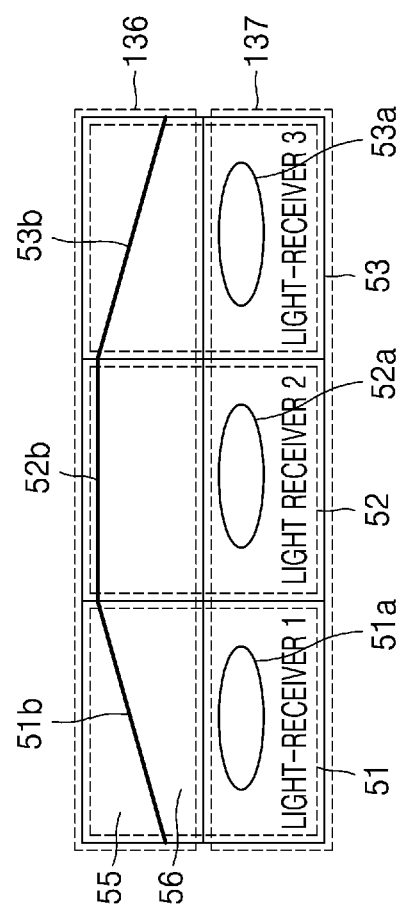
Figure 6B:
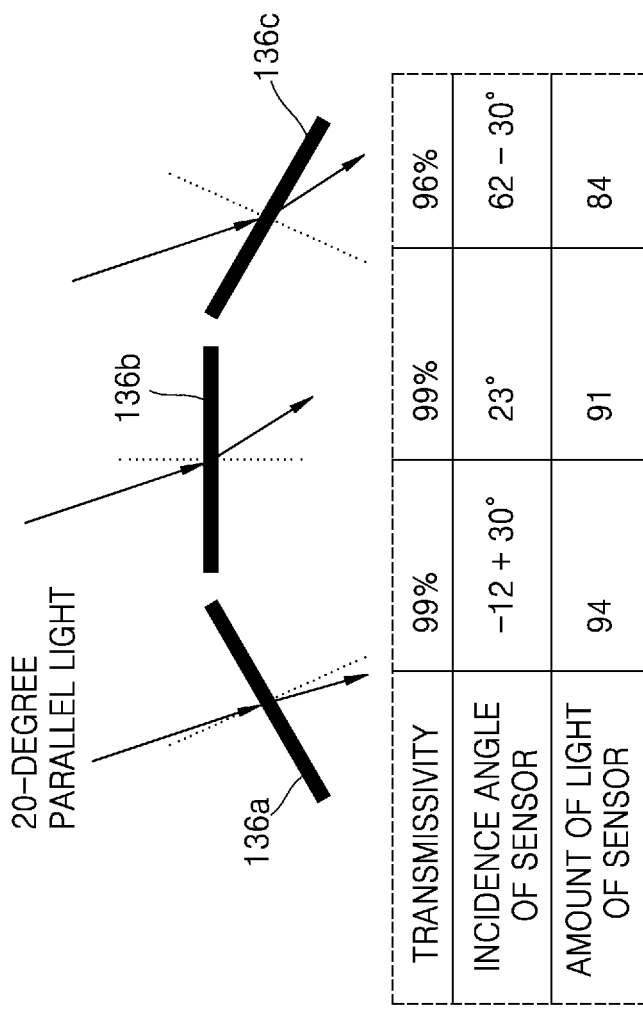
Figure 7:
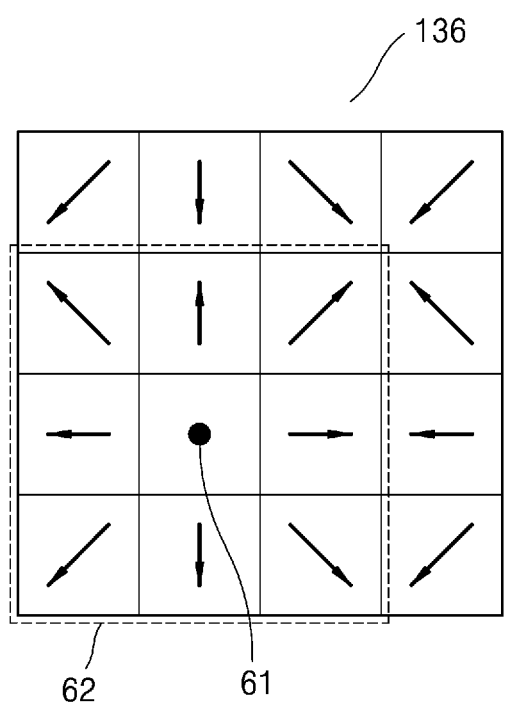
FIG. 7 is a view for describing an example of arrangement of a transparent cover portion, according to an embodiment of the present disclosure.

FIG. 4 is a block diagram of an optical sensor unit according to an embodiment of the present disclosure. FIGS. 5A and 5B are views for describing the structure of an optical sensor unit according to an embodiment of the present disclosure. FIGS. 6A and 6B are views for describing an example of optical sensing using an optical sensor unit, according to an embodiment of the present disclosure. FIG. 7 is a view for describing an example of arrangement of a transparent cover portion, according to an embodiment of the present disclosure.

As shown in FIG. 4, the optical sensor unit 135 according to an embodiment of the present disclosure may include the light-receiver 137 and the transparent cover portion 136.

The electronic device 100 according to an embodiment of the present disclosure may include the plurality of optical sensor units 135. Each optical sensor unit 135 may include the light-receiver 137 and the transparent cover portion 136 arranged on the light-receiver 137.

As shown in FIG. 5A, each optical sensor unit 135 may be arranged on a plurality of layers constituting the display 110.

The display 110 may be implemented with, for example, an LCD, an LED, an OLED, etc. According to an embodiment of the present disclosure, the light-receiver 137 may be arranged on the plurality of layers constituting the display 110 and the transparent cover portion 136 may be arranged on the light-receiver 137.

According to an embodiment of the present disclosure, the plurality of optical sensor units 135 may be arranged to respectively correspond to a plurality of regions divided on the entire region of the display 110 in the form of a matrix. For example, the entire region (1920*1080) of the display 110 may be divided in the form of a matrix, and 1920*1080 optical sensor units 135 may be arranged in the respective regions. The optical sensor unit 135 arranged in each region divided on the display 110 may detect the intensity and direction of external light incident to each region.

Referring to FIG. 5B, for example, a first light-receiver 51a and a first transparent cover portion 51b on the first light-receiver 51a may be arranged. A second light-receiver 52a and a second transparent cover portion 52b on the second light-receiver 52a may be arranged. A third light-receiver 53a and a third transparent cover portion 53b on the third light-receiver 53a may be arranged. FIG. 5B schematically shows a partial example of the plurality of optical sensor units 135.

The light-receiver 137 according to an embodiment of the present disclosure may sense the intensity of light (or the amount of light) incident thereto.

The light-receiver 137 according to an embodiment of the present disclosure may include a transparent photodiode.

The transparent photodiode, which is also referred to as an optical diode, is one of optical sensors that convert light energy into electrical energy, has high response speed, long sensitivity wavelength, and good linearity of photoelectric current, and is used for accurate measurement of the intensity of light.

The light-receiver 137 according to an embodiment of the present disclosure may convert the received light into an optical signal and transmit the same to the processor 130.

According to an embodiment of the present disclosure, the transparent cover portion 136 may be arranged on the light-receiver 137.

The transparent cover portion 136 may be manufactured using, without being limited to, a transparent material, e.g., crystal.

According to an embodiment of the present disclosure, external light may be incident through the transparent cover portion 136 arranged corresponding to the light-receiver 137, and the incident light may be refracted while passing through the transparent cover portion 136 and thus may be collected by the light-receiver 137.

According to an embodiment of the present disclosure, each transparent cover portion 136 may be arranged inclined at different angles selected at random. As shown in FIG. 5B, a first transparent cover portion 51b, a second transparent cover portion 52b, and a third transparent cover portion 53b may be arranged inclined at different angles.

According to an embodiment of the present disclosure, as the plurality of transparent cover portions 136 are arranged at various angles, the optical sensor unit 135 may sense light incident at various angles.

According to an embodiment of the present disclosure, an upper region 55 and a lower region 56 of the transparent cover portion 136 may be processed with different media. For the upper region 55 and the lower region 56 of the transparent cover portion 136, materials having an optimal refractive index for sensing external light incident from various directions may be selected.

Moreover, according to an embodiment of the present disclosure, a top surface of a processed material in the upper region 55 of the transparent cover portion 136 may be coated evenly using resin.

FIGS. 6A and 6B illustrate an example of measuring the intensity of light.

The electronic device 100 according to an embodiment of the present disclosure may calculate the intensity and direction of light by using Fresnel's formulas. The Fresnel's Formulas is an equation using a property where reflection and refraction occur when light passes through from a medium having a refractive index of n1 to a medium having a refractive index of n2.

FIG. 6A shows examples of a transmissivity, an incidence angle, and a sensed amount of light when 45-degree parallel light passes through transparent cover portions 136a, 136b, and 136c that are arranged inclined at different angles. For example, the first transparent cover portion 136a may be arranged inclined at 30 degrees, the second transparent cover portion 136b at 0 degree, and the third transparent cover portion 136c at 30 degrees.

Due to different media processed on the upper and lower regions of the transparent cover portion 136, reflection and refraction of light may occur when the light passes through the transparent cover portion 136.

For example, sensing values of the light passing through the first transparent cover portion 136a and the second transparent cover portion 136b may be calculated as 67 and 56.4, respectively, and the light passing through the third transparent cover portion 136c may be totally reflected, such that the amount of light may be calculated as 0.

FIG. 6B shows examples of a transmissivity, an incidence angle, and a sensed amount of light when 20-degree parallel light passes through the transparent cover portions 136a, 136b, and 136c that are arranged inclined at different angles.

For example, sensing values of light passing through the first transparent cover portion 136a, the second transparent cover portion 136b, and the third transparent cover portion 136c may be calculated as 94, 91, and 84, respectively.

FIG. 7 shows an example of a plurality of transparent cover portions 136 viewed from top.

According to an embodiment of the present disclosure, each transparent cover portion 136 arranged in each of a plurality of regions may be arranged inclined at a different angle selected at random. An arrow indicated in the plurality of regions shown in FIG. 7 may be an example for describing that the plurality of transparent cover portions 136 may be arranged inclined at various angles 360-degree omni-directionally.

As shown in FIG. 7, as the plurality of transparent cover portions 136 are arranged inclined at various angles 360-degree omni-directionally, the plurality of optical sensor units 135 may sense light incident at various angles.

According to an embodiment of the present disclosure, when the external light passes through the plurality of transparent cover portion 136 arranged inclined a certain angle, the electronic device 100 may store a table previously set up for a sensing value of the optical sensor unit 135 with respect to light incident with a certain intensity in a certain direction.

Thus, the electronic device 100 may perform calibration with respect to the sensing value based on an arrangement angle of the transparent cover portion 136 by using a previously stored table.

Meanwhile, according to an embodiment of the present disclosure, when the electronic device 100 determines the direction of light corresponding to one of the plurality of regions of the display 110, the electronic device 100 may determine the direction of light corresponding to the region based on the direction of light corresponding to a nearby region.

Referring to FIG. 7, for example, when the direction of light corresponding to a region 61 is determined, the direction of the light corresponding to the region 61 may be determined based on a detection result with respect to the direction of light corresponding to a nearby region 62.

FIGS. 4 through 7 are used to describe an embodiment of the present disclosure, and the present disclosure is not limited thereto.

Figure 8:
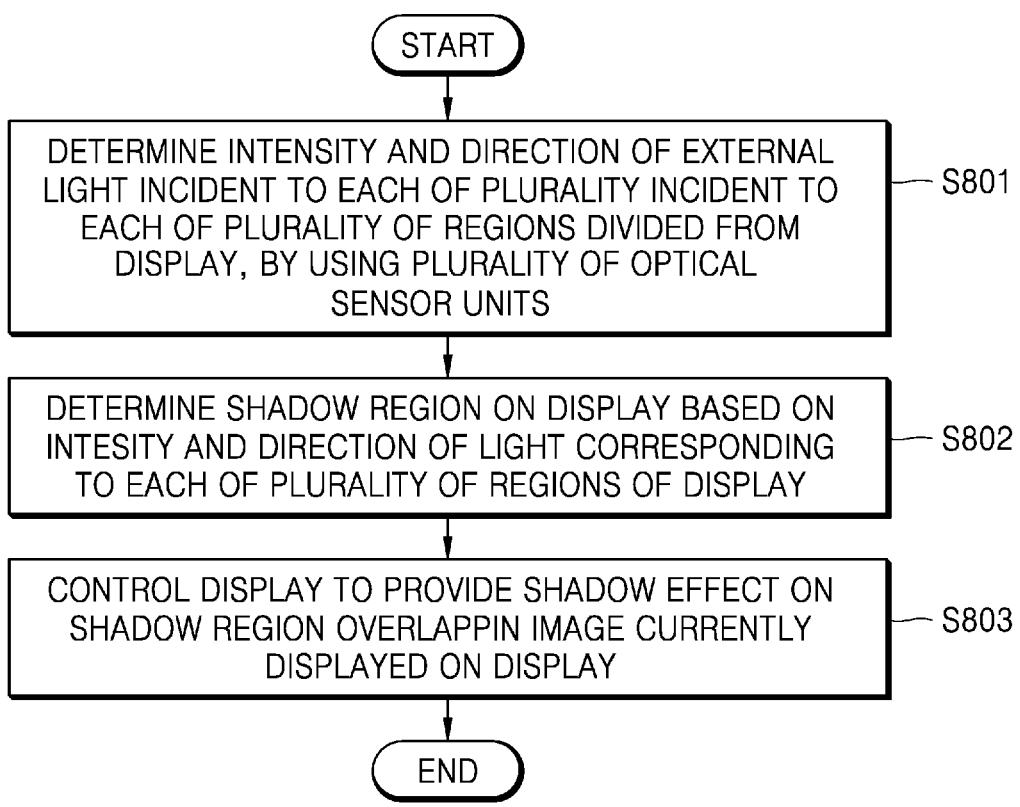
FIG. 8 is a flowchart of an operating method of an electronic device according to an embodiment of the present disclosure.

FIG. 8 is a flowchart of an operating method of an electronic device according to an embodiment of the present disclosure.

In operation S801 of FIG. 8, the electronic device 100 may determine the intensity and direction of external light incident to each of a plurality of regions divided on the display 110 using a plurality of optical sensor units 135.

According to an embodiment of the present disclosure, the electronic device 100 may determine the intensity of light corresponding to each of the plurality of regions divided on the display 110 based on a sensing value of the light-receiver 137 arranged in each of the plurality of regions of the display 110.

The electronic device 100 may determine the direction of external light incident to a sensed region, based on the sensed intensity of the light and the arrangement angle of the transparent cover portion 136 arranged in the sensed region.

According to an embodiment of the present disclosure, the electronic device 100 may calculate the intensity and direction of the external light for each region divided on the display 110 based on the intensity of the light sensed by the optical sensor unit 135 and the arrangement angle of the transparent cover portion 136, by using Fresnel's Formulas.

Meanwhile, according to an embodiment of the present disclosure, as the electronic device 100 includes a large number of optical sensor units 135 in the densely divided region, the electronic device 100 may express a shadow effect more precisely based on multiple data corresponding to each divided region.

For example, when the display 110 is divided into a matrix of 1920*1080 and the optical sensor unit 135 is arranged to correspond to each divide region, the electronic device 100 may obtain 1920*1080 sensing values respectively corresponding to the 1920*1080 divided regions.

In operation S802, the electronic device 100 may determine a shadow region on the display 110 based on the intensity and direction of light corresponding to each of the plurality of regions divided on the display 110.

According to an embodiment of the present disclosure, the electronic device 100 may determine a darker region than a predefined threshold value as a shadow region among all the regions of the display 110.

According to an embodiment of the present disclosure, the electronic device 100 may determine the shadow region by comparing the intensity and direction of light corresponding to one of the plurality of regions of the display 110 with the intensity and direction of light corresponding to a nearby region. The electronic device 100 may determine a darker region than a nearby region as a shadow region among all the regions of the display 110.

In operation S803, the electronic device 100 may control the display 110 to provide a shadow effect on the shadow region, overlappingly with an image currently displayed on the display 110.

According to an embodiment of the present disclosure, the electronic device 100 may provide the shadow effect by adjusting a brightness of the shadow region. According to an embodiment of the present disclosure, when the image is currently displayed on the display 110, the electronic device 100 may control the display 110 to display the shadow region more darkly than the nearby region such that the user may recognize as if a shadow is actually cast on the shadow region.

According to an embodiment of the present disclosure, the electronic device 100 may adjust the brightness of each pixel corresponding to the shadow region of the display 110 such that the shadow region is displayed darker than the nearby region.

According to an embodiment of the present disclosure, the electronic device 100 may adjust the brightness of backlight such that the shadow region is displayed darker than the nearby region.

According to an embodiment of the present disclosure, the electronic device 100 may perform image processing on a portion corresponding to the shadow region such that the portion corresponding to the shadow region in an image to be displayed is displayed darker than the nearby region.

The electronic device 100 may provide the shadow effect by displaying a shadow image corresponding to the shadow region overlappingly with the image currently displayed on the display region.

According to an embodiment of the present disclosure, the electronic device 100 may adjust the brightness, color, and gradation level, etc., of the shadow effect, based on the intensity and direction of the light on the shadow region.

Figure 9:
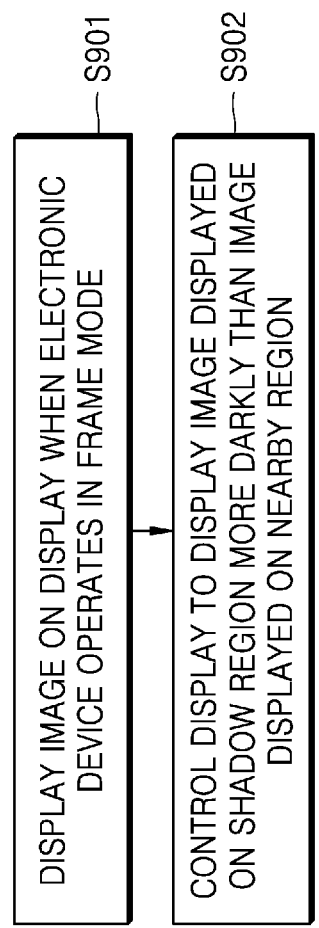
FIG. 9 is a flowchart for describing an example of an operation of a frame mode of an electronic device, according to an embodiment of the present disclosure.

FIG. 9 is a flowchart for describing an example of an operation of a frame mode of an electronic device, according to an embodiment of the present disclosure.

In operation S901 of FIG. 9, the electronic device 100 may control an image to be displayed on the display 110 when operating in the frame mode.

According to an embodiment of the present disclosure, the electronic device 100 may display an image stored in the memory 120 of the electronic device 100 on the display 110. According to an embodiment of the present disclosure, the electronic device 100 may display an image received from an external device (not shown) on the display 110.

According to an embodiment of the present disclosure, the electronic device 100 may display an image such as a famous painting, a picture, etc., stored in the memory 120 on the display 110, according to a condition that is preset at the time of manufacturing of the electronic device 100 or a setting condition corresponding to a user input, when operating in the frame mode.

According to an embodiment of the present disclosure, the electronic device 100 may display a preset image or an image selected at random on the display 110. The electronic device 100 may display an image selected at random from among a plurality of images during a preset time and then change the selected image into another image selected at random and display the other image. The electronic device 100 may sequentially display the plurality of images in a preset order, without being limited thereto.

In operation S902 of FIG. 9, the electronic device 100 may control the display 110 to display an image displayed on the shadow region more darkly than an image displayed on a nearby region.

According to an embodiment of the present disclosure, as the electronic device 100 controls the shadow region to be displayed darker than the nearby region, the user viewing the display 110 may recognize as if a shadow actually appears on the shadow region. Thus, the user may recognize as if the electronic device 100 displaying the image is an actual frame, without a sense of difference from nearby objects in one space.

According to an embodiment of the present disclosure, the electronic device 100 may adjust the brightness of each pixel corresponding to the shadow region of the display 110 such that the shadow region is displayed darker than the nearby region. According to an embodiment of the present disclosure, the electronic device 100 may adjust the brightness of backlight such that the shadow region is displayed darker than the nearby region. According to an embodiment of the present disclosure, the electronic device 100 may perform image processing on a portion corresponding to the shadow region such that the portion corresponding to the shadow region in an image to be displayed is displayed darker than the nearby region.

According to an embodiment of the present disclosure, the electronic device 100 may adjust the darkness level, color, and gradation level, etc., of the shadow effect, based on the intensity and direction of the light on the shadow region.

FIGS. 8 and 9 are used to describe an embodiment of the present disclosure, and the present disclosure is not limited thereto.

Figure 10:
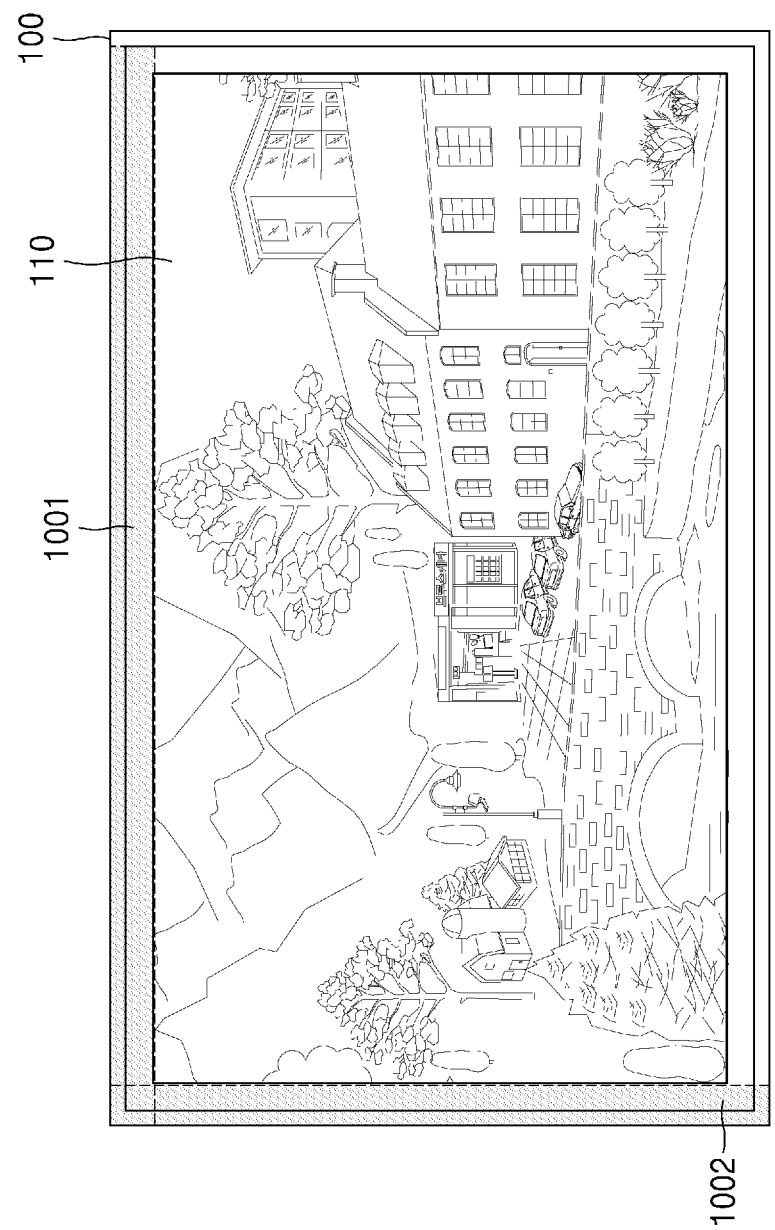
FIGS. 10 through 12 are views for describing an example of an operation of a frame mode of an electronic device, according to an embodiment of the present disclosure.
Figure 11:
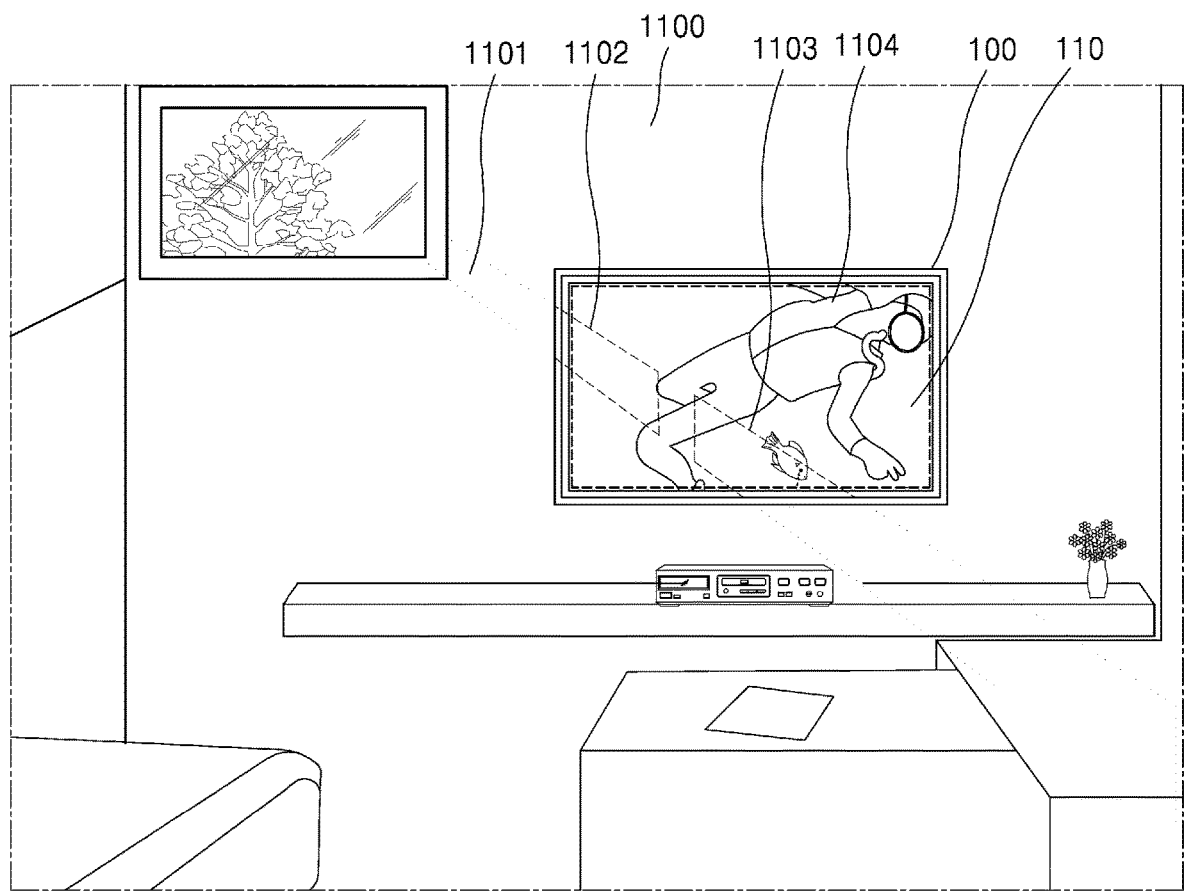
Figure 12:
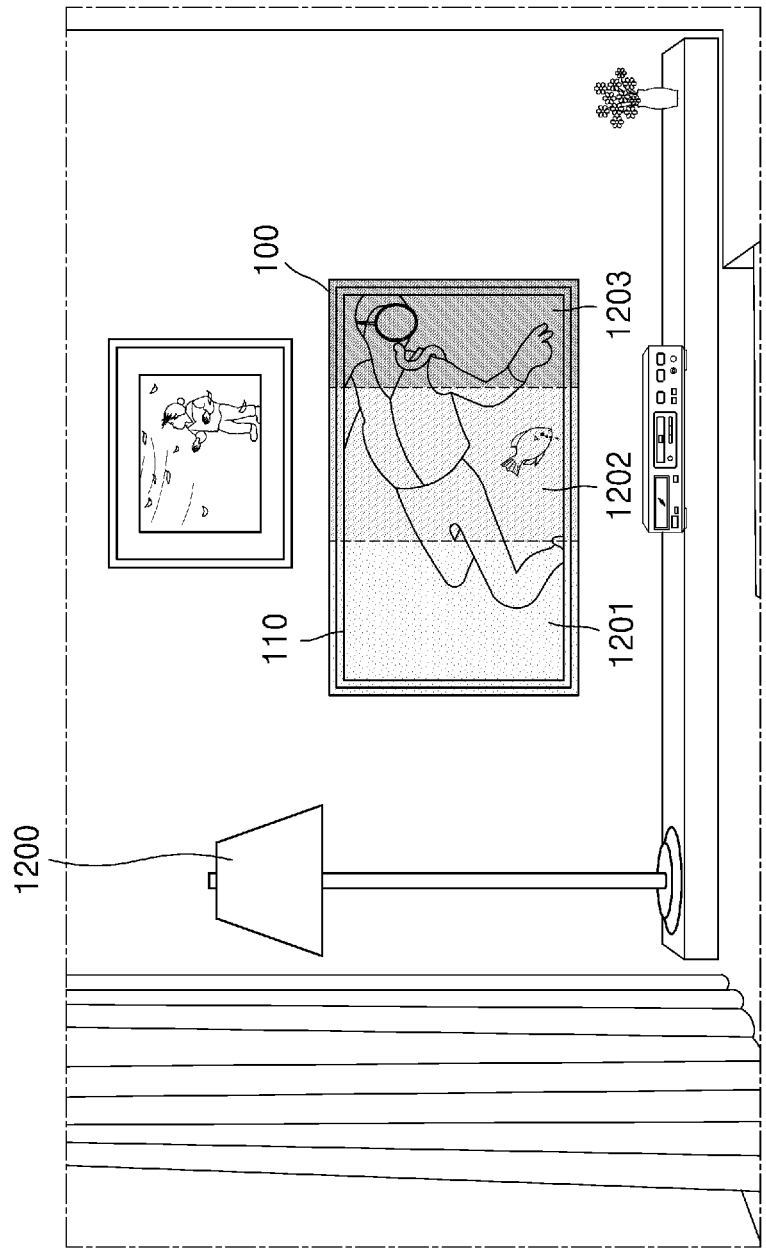

FIGS. 10 through 12 are views for describing an example of an operation of a frame mode of an electronic device, according to an embodiment of the present disclosure.

As shown in FIG. 10, for example, when the electronic device 100 includes a frame mounted protruding from the surface of the display 110 on an edge of the front display 110 of the electronic device 100, shadows 1001 and 1002 of the frame may be displayed on the display 110 by the electronic device 100 or external light such as sun light, a lighting, etc., incident near the electronic device 100.

The electronic device 100 according to an embodiment of the present disclosure may determine the shadow region by detecting the intensity and direction of external light incident to the display 110, and control the display 110 to provide the shadow effect to the shadow region.

Referring to FIG. 10, an upper corner region 1001 and a left corner region 1002 of the display 110 may be determined as shadow regions. The electronic device 100 may control the display 110 to provide the shadow effect on the shadow region, overlappingly with the displayed image.

According to an embodiment of the present disclosure, the electronic device 100 may adjust the intensity of the shadow effect, based on the intensity and direction of the light on the shadow region. The electronic device 100 may adjust the brightness and darkness, color, etc., of the shadow according to the intensity and direction of light sensed in each region in which the optical sensor unit 135 is arranged.

For example, when the electronic device 100 provides the shadow effect to the shadow region 1001, the electronic device 100 may display the image such that the brightness of the shadow gradually increases in a direction from an outer edge toward an inner region of the display 110.

According to an embodiment of the present disclosure, the electronic device 100 may provide a natural shadow effect that is close to an actual shadow, by using the plurality of optical sensor units 135 arranged to sense the densely divided region of the display 110.

As shown in FIG. 11, for example, as light comes from a window near the electronic device 100 mounted on a wall 1100, a bright and dark region may be generated on the display 110 provided on the front surface of the electronic device 100 due to reflection caused by a nearby object.

According to an embodiment of the present disclosure, the electronic device 100 may provide the shadow effect on the display 110, based on the sensed intensity and direction of the light.

Referring to FIG. 11, the electronic device 100 may control a first region 1102 and a second region 1103 on the display 110, which are bright regions due to external light, to be displayed bright, and control a third region 1104, which is a dark region, to be displayed dark.

Thus, the first region 1102 of the display 110 mounted on the wall 1100 and a region 1101 in which light of the wall is reflected may be recognized continuous to the user as the same wall.

As shown in FIG. 12, for example, as a lighting 1200 casts a light in a left region of the display 110 in a dark space, the left region of the display 100 close to the lighting may be shown bright and may be shown gradually dark from the left region of the display 100 to a right region of the display 100.

According to an embodiment of the present disclosure, the electronic device 100 may control the display 110 to display a bright region that is bright by being shined by light of the lighting 1200 more brightly and other regions gradually darkly in a direction away from the light of the lighting 1200.

For example, a first region 1201, a second region 1202, and a third region 1203 of the display 110 may be shown dark gradually in that order.

While a description has been made with the three regions 1201, 1202, and 1203 for convenience thereof in FIG. 12, the brightness and darkness of the display 110 may be adjusted such that the user may recognize as if the display 110 gradually becomes dark or bright seamlessly without division of the regions.

Figure 13:
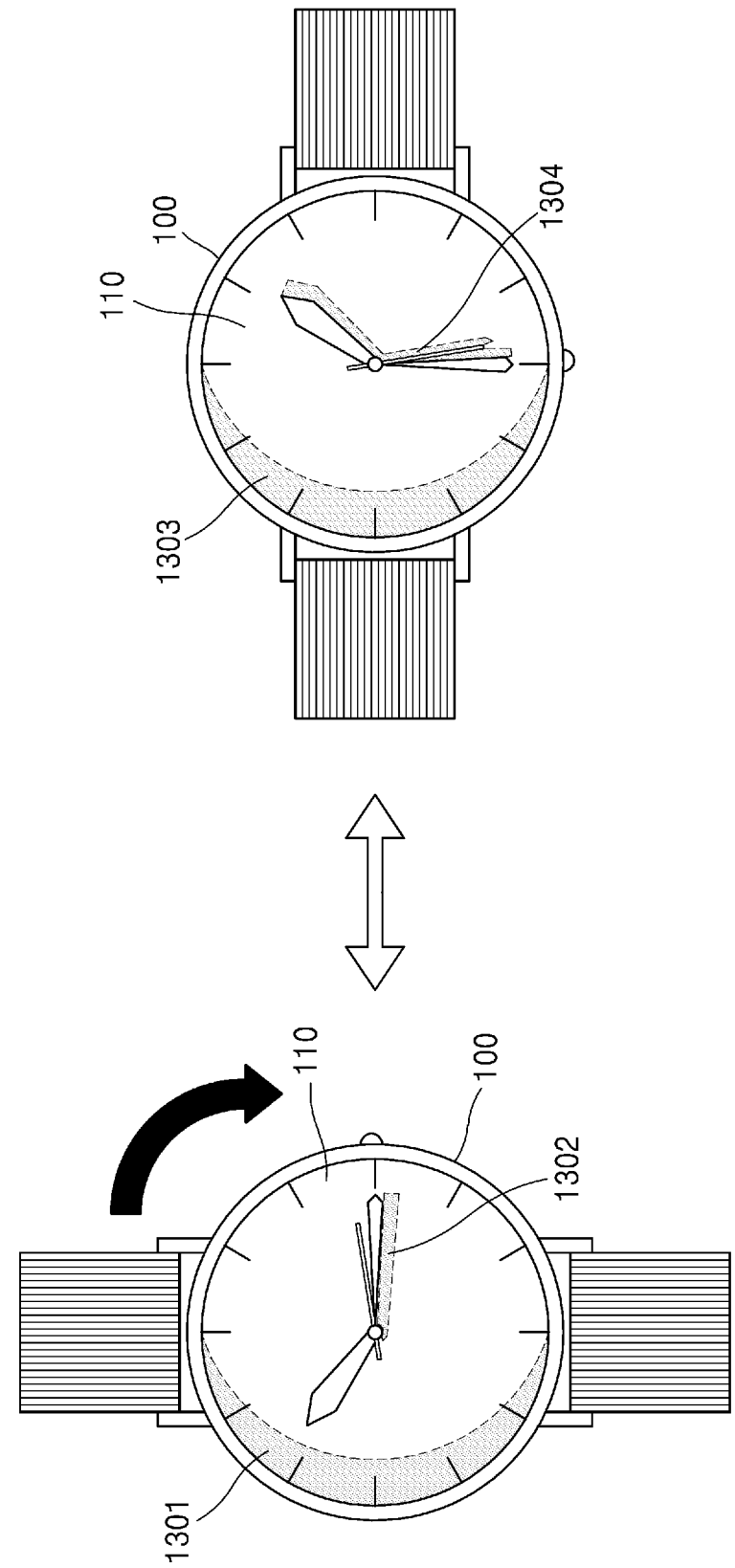
FIG. 13 is a view for describing an example of an operating method of an electronic device according to another embodiment of the present disclosure.

FIG. 13 is a view for describing an example of an operating method of an electronic device according to another embodiment of the present disclosure.

In the example of FIG. 13, the electronic device 100 is a watch-type wearable device.

Generally, as a wrist watch is shined, a shadow of an edge of the watch and a shadow of hands of the watch may appear on a surface on which the hands of the watch are placed. When the user moves while wearing the wrist watch, the direction or intensity of light changes along with movement of the wrist watch, such that the brightness or darkness or position of a shadow may naturally change.

According to an embodiment of the present disclosure, on the display 110 of the electronic device 100 that is the watch-type wearable device, like a general wrist watch, a shadow of an edge of the watch and a shadow of hands of the watch may naturally appear.

Referring to FIG. 13, for example, when the electronic device 100 operates in a mode providing the watch to the display 110, a shadow 1301 of the edge of the watch and a shadow 1302 of the hands of the watch may be displayed on the display 110. Moreover, as the user wearing the electronic device 100 moves or the electronic device 100 is moved, even when the intensity or direction of light incident to the electronic device 100 changes, a shadow 1303 of an edge of the watch and a shadow 1304 of hands of the watch may be naturally displayed on the display 110 according to the changed intensity or direction of the light.

FIGS. 10 through 13 are used to describe an embodiment of the present disclosure, and the present disclosure is not limited thereto.

Figure 14:
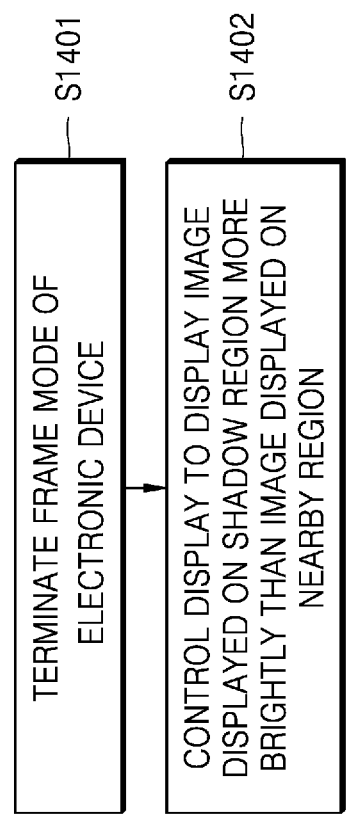
FIG. 14 is a flowchart for describing an example of an operation when a frame mode of an electronic device is terminated, according to an embodiment of the present disclosure.
Figure 15:
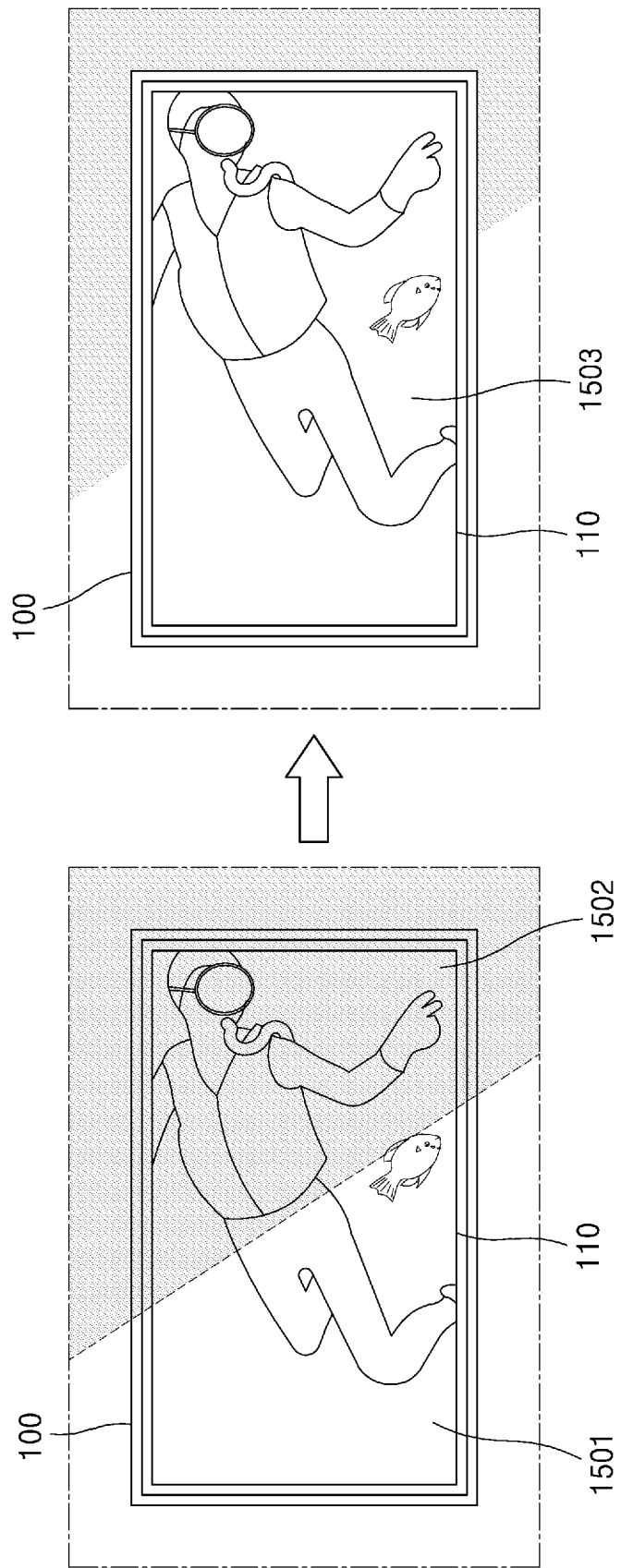
FIG. 15 is a view for describing an example of an operation when a frame mode of an electronic device is terminated, according to an embodiment of the present disclosure.

FIG. 14 is a flowchart for describing an example of an operation when a frame mode of an electronic device is terminated, according to an embodiment of the present disclosure. FIG. 15 is a view for describing an example of an operation when a frame mode of an electronic device is terminated, according to an embodiment of the present disclosure. A description will be made of the flowchart of FIG. 15 with reference to FIG. 15.

In operation S1401 of FIG. 14, the frame mode of the electronic device 100 may be terminated.

According to an embodiment of the present disclosure, when the electronic device 100 operates in a normal mode to which the frame mode is terminated.

In operation S1402 of FIG. 14, the electronic device 100 may control the display 110 to display an image displayed on the shadow region more brightly than an image displayed on a nearby region.

As shown in FIG. 15, when external light shines the periphery of the electronic device 100, a partial region 1501 of the display 110 may be bright and another partial region 1502 of the display 110 may be dark due to a shadow of a nearby object.

According to an embodiment of the present disclosure, the electronic device 100 may control the display 110 to display an image displayed on the dark region 1502 more brightly than the nearby region 1501. The electronic device 100 may adjust the brightness and darkness of the display 110 such that a whole region 1503 of the display 110 looks like having a uniform brightness. Thus, the user may watch contents with similar brightness.

According to an embodiment of the present disclosure, the electronic device 100 may adjust the brightness of each pixel corresponding to the dark region 1502 (of FIG. 15) of the display 110 such that the dark region 1502 of FIG. 15 is displayed brighter than the nearby region 1501 of FIG. 15. According to an embodiment of the present disclosure, the electronic device 100 may adjust the brightness of backlight such that the dark region 1502 of FIG. 15 is displayed brighter than the nearby region 1501 of FIG. 15. According to an embodiment of the present disclosure, the electronic device 100 may perform image processing on a portion corresponding to the dark region 1502 of FIG. 15 such that the portion corresponding to the dark region 1502 of FIG. 15 in an image to be displayed is displayed brighter than the nearby region.

FIGS. 14 and 15 are used to describe an embodiment of the present disclosure, and the present disclosure is not limited thereto.

Meanwhile, the foregoing embodiment may be written as a program executable on computers, and may be implemented on a general-purpose digital computer operating the program by using a computer-readable recording medium. In addition, a structure of data used in the foregoing embodiment may be recorded on a computer-readable recording medium using various means. Moreover, the foregoing embodiment may be implemented with a recording medium including a computer-executable command such as a computer-executable programming module. For example, methods implemented with a software module or algorithm may be stored in a computer-readable recording medium as codes or program instructions that are readable and executable by computers.

The computer-readable recording medium may be an available medium that is accessible by a computer, and includes all of a volatile medium, a non-volatile medium, a separated medium, and a non-separated medium. The computer-readable recording medium may include, but not limited to, a storage medium, for example, a magnetic storage medium such as a read-only memory (ROM), a floppy disk, a hard disk, etc., an optical reading medium such as a compact-disc (CD)-ROM, a digital versatile disc (DVD), etc. The computer-readable recording medium may also include both a computer storage medium and a communication medium.

Moreover, a plurality of computer-readable recording media may be distributed over network-connected computer systems, and data, for example, program instructions and codes, stored in the distributed recording media, may be executed by at least one computer.

The particular implementations described in the present disclosure are illustrative examples and are not intended to otherwise limit the scope of the present disclosure in any way. For the sake of brevity, conventional electronics, control systems, software development and other functional aspects of the systems may not be described in detail.

Those of ordinary skill in the art to which the present disclosure pertains will appreciate that the present disclosure may be implemented in different detailed ways without departing from the technical spirit or essential characteristics of the present disclosure. Accordingly, the aforementioned embodiments of the present disclosure should be construed as being only illustrative, but should not be constructed as being restrictive from all aspects. For example, each element described as a single type may be implemented in a distributed manner, and likewise, elements described as being distributed may be implemented as a coupled type.

The use of all examples or exemplary terms is merely intended to describe the present disclosure in detail, and the scope is not necessarily limited by the examples or exemplary terms unless defined by the claims.

Moreover, no item or component is essential to execution of the present disclosure unless the element is specifically described as "essential" or "critical".

It would be understood by those of ordinary skill in the art that the present disclosure may be implemented in a modified form without departing from the essential characteristics of the present disclosure.

The present disclosure may have various modifications and several embodiments thereof, and thus the present disclosure is not limited by the specific embodiments described in the specification, and it should be understood that all modifications, equivalents, or substitutions within the spirit and scope of the present disclosure are included in the present disclosure. Therefore, the disclosed embodiments of the present disclosure should be understood in an illustrative sense rather than a restrictive sense.

The scope of the present disclosure is defined by the following claims rather than the detailed description, and the meanings and scope of the claims and all changes or modified forms derived from their equivalents should be construed as falling within the scope of the present disclosure.

The term used in the embodiments such as "unit" or "module" indicates a unit for processing at least one function or operation, and may be implemented in hardware, software, or in a combination of hardware and software.

The term "unit" or "module" may be implemented by a program that is stored in an addressable storage medium and executable by a processor.

For example, the term "unit" or "module" may include software components, object-oriented software components, class components and task components, processes, functions, attributes, procedures, subroutines, segments of a program code, drivers, firmware, microcode, circuitry, data, databases, data structures, tables, arrays, and variables.

Herein, the mentioning "A includes one of a1, a2, and a3" may have a large meaning that an exemplary element included in an element A is a1, a2, or a3.

Due to the mentioning, an element constituting the element A is not necessarily limited to a1, a2, or a3. Thus, it should be noted that the element constituting the element A is not exclusively interpreted as meaning that other elements that are not listed, except for a1, a2, and a3, are excluded.

In addition, the mentioning may mean that A includes a1, includes a2, or includes a3. The mentioning may not mean that the elements constituting A are selectively determined necessarily in a certain set. For example, it should be noted that the mentioning is not limitedly interpreted as a1, a2, or a3, selected from a set including a1, a2, and a3, necessarily constituting the component A.

Moreover, herein, the mentioning "at least one of a1, a2, or a3" may indicate one of "a1", "a2", "a3", "a1 and a2", "a1 and a3", "a2 and a3", and "a1, a2, and a3". It should also be noted that unless explicitly mentioned as "at least one of a1, at least one of a2, and at least one of a3", the mentioning "at least one of a1, a2, or a3" should not be interpreted as "at least one of a1", "at least one of a2", and "at least one of a3".

The invention claimed is:

1. An electronic device comprising:
   a display;
   a plurality of optical sensor units arranged to respectively correspond to a plurality of regions divided on the display;
   a memory storing one or more instructions; and
   a processor configured to execute the one or more instructions to:
      determine, by using the plurality of optical sensor units, an intensity and a direction of external light incident on each of the plurality of regions divided on the display;
      determine a darker region that is darker than a nearby region as a shadow region from among an entire region of the display, based on the intensity and the direction of the external light corresponding to each of the plurality of regions; and
      control the display to provide a shadow effect by adjusting a brightness of a portion of an image corresponding to the determined shadow region from among the image currently displayed on the entire region of the display.

2. The electronic device of claim 1, wherein the plurality of optical sensor units is arranged on a plurality of layers that constitute the display and each of the plurality of optical sensor units comprises a light-receiver and a transparent cover portion arranged on the light-receiver, and
   wherein the processor is further configured to:
      sense the intensity of the external light incident on each of the plurality of regions of the display, by using the light-receiver of each of the plurality of optical sensor units; and
      determine the direction of the external light incident on a region of the plurality of regions, based on the sensed intensity of the external light and an angle of the transparent cover portion of an optical sensor unit of the plurality of optical sensor units arranged in the region.

3. The electronic device of claim 2, wherein the transparent cover portions are respectively arranged on the plurality of regions to be inclined at different angles with respect to the plurality of regions.

4. The electronic device of claim 2, wherein the processor is further configured to determine the direction of the external light corresponding to the region of the plurality of regions, based on the direction of the external light corresponding to a nearby region around the region.

5. The electronic device of claim 1, wherein the processor is further configured to determine the shadow region by comparing the intensity and the direction of the external light corresponding to a region of the plurality of regions with the intensity and the direction of the external light corresponding to a nearby region around the region.

6. The electronic device of claim 1, wherein the processor is further configured to control the electronic device to display the image on the display based on the electronic device operating in a frame mode, and
   the image comprises at least one of an image stored in the memory or an image received from an external device.

7. The electronic device of claim 1, wherein the processor is further configured to provide the shadow effect by controlling the display to display the portion of the image displayed on the determined shadow region to be darker than another portion of the image displayed on a nearby region around the determined shadow region.

8. The electronic device of claim 6, wherein the processor is further configured to control the display to display the image displayed on the determined shadow region to be brighter than the image displayed on a nearby region around the determined shadow region based on the frame mode of the electronic device being terminated.

9. The electronic device of claim 2, wherein the light-receiver of each of the plurality of optical sensor units comprises a transparent photodiode.

10. An operating method of an electronic device, the operating method comprising:
   determining an intensity and a direction of external light incident on each of a plurality of regions divided on a display, by using a plurality of optical sensor units arranged to respectively correspond to the plurality of regions;
   determining a darker region that is darker than a nearby region as a shadow region from among an entire region of the display, based on the intensity and the direction of the external light corresponding to each of the plurality of regions; and
   controlling the display to provide a shadow effect by adjusting a brightness of a portion of an image corresponding to the determined shadow region from among the image currently displayed on the entire region of the display.

11. The operating method of claim 10, wherein the plurality of optical sensor units is arranged on a plurality of layers that constitute the display and each of the plurality of optical sensor units comprises a light-receiver and a transparent cover portion arranged on the light-receiver, and
the determining the intensity and the direction of the external light comprises:
sensing the intensity of the external light incident on each of the plurality of regions by using the light-receiver of each of the plurality of optical sensor units; and
determining the direction of the external light incident on a region of the plurality of regions, based on the sensed intensity of the external light and an angle of the transparent cover portion of an optical sensor of the plurality of optical sensor units arranged in the region.

12. The operating method of claim 11, wherein the transparent cover portions are respectively arranged on the plurality of regions to be inclined at different angles with respect to the plurality of regions.

13. The operating method of claim 11, wherein the determining the intensity and the direction of the external light further comprises:
determining the direction of the external light corresponding to the region of the plurality of regions, based on the direction of the external light corresponding to a nearby region around the region.

14. The operating method of claim 10, wherein the determining the shadow region comprises determining the shadow region by comparing the intensity and the direction of the external light corresponding to a region of the plurality of regions with the intensity and the direction of the external light corresponding to a nearby region around the region of the plurality of regions.

15. A non-transitory computer-readable recording medium having recorded thereon a program which, when executed by a computer, causes the computer to execute the operating method of claim 10.

* * * * *